United States Patent [19]

Koskinenm

[11] 3,788,544
[45] Jan. 29, 1974

[54] AGRICULTURAL IRRIGATION SYSTEM
[76] Inventor: Onni S. Koskinenm, West Bloomfield, Birmingham, Mich. 48033
[22] Filed: Feb. 2, 1973
[21] Appl. No.: 328,950

[52] U.S. Cl............ 239/11, 239/268, 239/534
[51] Int. Cl............................................ B05b 17/04
[58] Field of Search....... 239/93, 101, 11, 266, 268, 239/269, 435, 534, 542, 546, 571; 47/48.5, 17, 38; 141/25, 21

[56] References Cited
UNITED STATES PATENTS
2,855,725  10/1958  Carothers ................. 239/268 X
3,361,161  1/1968  Schwartz .................. 239/534 X
3,606,157  9/1971  Chapin ..................... 239/542 X Primary Examiner—Allen N. Knowles
Assistant Examiner—John J. Love
Attorney, Agent, or Firm—Whittmore, Hulbert & Belknap

[57] ABSTRACT

An agricultural irrigation system is provided wherein a plurality of relatively small water storage emitters are located in a land area to be irrigated. Means are provided to simultaneously fill all of the emitters from a central source of water pressure and them simultaneously to actuate each emitter for flow of water therefrom for irrigation purposes.

16 Claims, 7 Drawing Figures

AGRICULTURAL IRRIGATION SYSTEM

BACKGROUND OF THE INVENTION

The invention relates to a method of irrigation referred to as the "trickle method." At the present time, the invention is being applied experimentally in the Rio Grande Valley area of Texas in connection with citrus orchards. However, the system is well adapted for numerous other applications.

The system inherently incorporates several advantages over prior systems such as, for example, spray systems and ditch systems. The principal advantages may be enumerated as follows:

1. Water conservation — water is applied directly to the base of a tree in accordance with the present system. Evaporation losses are thereby reduced and water is not wasted in the irrigation of weeds thereby making weed control easier.
2. Labor conservation — little labor is required in comparison with previous systems.
3. Need for level land reduced — the present system of irrigation does not require the land upon which trees are growing to be exactly graded as is necessary in connection with a ditching system wherein the network of ditches is provided in an orchard with the water flowing therethrough as a consequence of gravity.
4. Clean water requirements reduced — the present invention employs an emitter which is capable of handling the usually muddy, gritty water supplied for irrigation which water often additionally carries with it suspended particles of vegetable matter. Such water may be used in connection with the emitters of the present invention without further or expensive filtration because the emitter functions without the use of an extremely restricted orifice. Prior art emitters utilized restricted orifices or an adjustable maze-like water passage to control water flow. Emitters of the present invention are designed to function without the use of such restricted orifices to thereby reduce the chance of clogging. The emitters are also adapted to operate reliably and accurately in spite of variations in water pressure, pipe length and land elevation.

SUMMARY OF THE INVENTION

Means and method for an agricultural irrigation system are provided. The system includes a source of water under pressure which is connected to a plurality of emitters located in a pattern for irrigating a land area. Each emitter comprises a vessel functioning as a water reservoir. Inlet means connect the vessels to the source of water under pressure. Outlet means are provided for each emitter for the flow of water from the vessels. Pressure operated valve means are provided in the outlet means of each emitter responsive to a reduction in inlet pressure to open and permit flow of water from the vessels.

IN THE DRAWINGS

Figure 1:
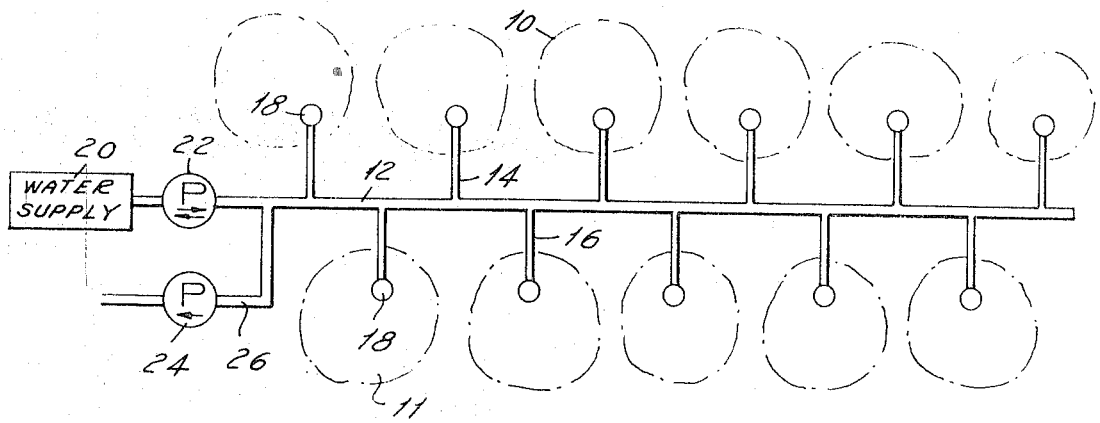
FIG. 1 is a diagrammatic view of an entire irrigation system for an orchard.

Referring now to FIG. 1, an exemplary system for trickle irrigating a citrus grove is illustrated. Two rows of citrus trees 10, 11 are illustratively served by a main water line 12 which extends between the rows of trees. Spaced apart branch lines 14 extend from one side of the line 12 to service the trees forming one row. Similar branch lines 16 extend from the other side of line 12 to service the trees 11 forming the adjacent row. An emitter 18 is provided at the end of each branch line at the base of each tree. The main line 12 is connected to a water supply 20 which may be a reservoir or other source of irrigation water. A reversible water pump 22 is provided in main line 12 to draw water from the water supply source and pump it under pressure through the line 12 and thence through branch lines 14, 16 to fill the emitters 18. The pump 22 is reversible so as to permit withdrawing water from the water lines 12, 14, 16 after the emitters 18 have been filled with water. A second vacuum pump 24 is illustratively connected by line 26 to line 12 at a point upstream of the pump 22. The function of pump 24 is to pull a vacuum in lines 12, 14, 16 in instances wherein it is desired to have a vacuum or negative pressure to assist in opening of valve structures in emitters 18. The pump 24 may be structurally integrated with pump 22 to provide both functions in a single unit if desired.

Figure 2:
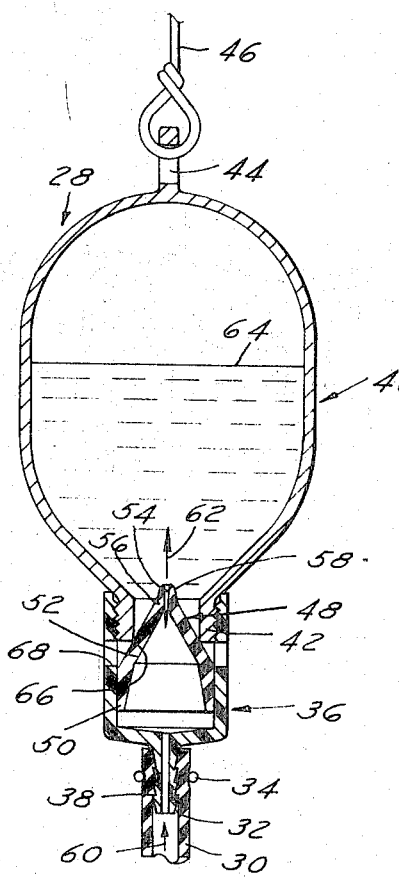
FIG. 2 is an elevational view in section illustrating one embodiment of an emitter in accordance with the present invention, the emitter being shown in the closed position.
Figure 3:
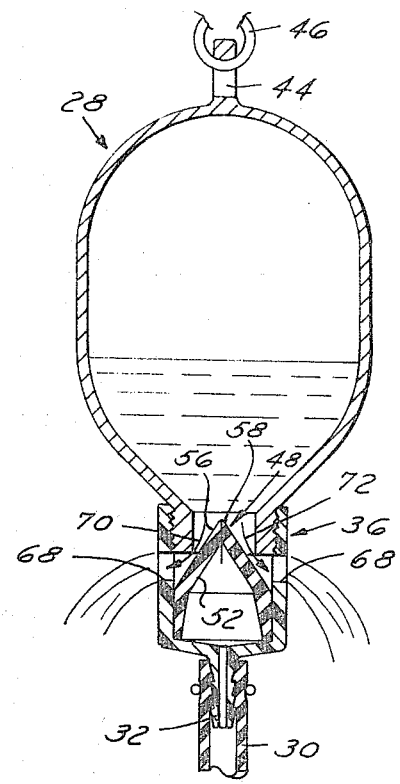
FIG. 3 illustrates the emitter of FIG. 2 in the open position permitting outward flow of water for irrigation purposes.

One suitable type of emitter 28 is illustrated in FIGS. 2 and 3. The emitter 28 is connected to main line 12 via a flexible nozzle 30 which is connected to a branch line which extends from the main line. The nozzle 30 extends over nozzle portion 32 which extends from a cup-shaped element 36. The nozzle portion 32 has exterior teeth 38 for secure engagement with the inner surface of supply nozzle 30. The nozzle portions are secured together by means of a spring clamp 34.

The upper mouth portion of element 36 is interiorly threaded to threadingly receive externally threaded neck portion 42 of bottle-like vessel 40. The vessel 40 serves as a reservoir for water to be dispensed for irrigation purposes. A bracket 44 is provided on the upper end of vessel 40 for suspension of the vessel from a suitable support structure via a hanger element 46.

A flexible valve element 48 fabricated on an elastomeric material is provided within element 36. The valve element 48 has a hollow cylindrical lower portion 50 and a hollow cone-shaped upper portion 52. The apex of the upper portion 52 is slitted at 54 to define a pair of opposed lips 56, 58 which will spread apart as illustrated in FIG. 2 for the passage of water under pressure through the valve element and into the vessel 40 to fill the vessel as indicated by the arrows 60, 62.

In operation, vessel 40 is first filled with water 64 to the desired level by pumping water through main line 12 at a positive pressure. The positive pressure not only opens the valve element for ingress of water into the vessel but forces the wall portions of the cone 52 against the lower edge 66 of the neck 42 to effectively seal the connection between the water source and the interof of vessel 40. This seal need not be perfect in order for the invention to operate satisfactorily.

The water pressure is maintained for a time sufficient to fill all of the vessels of the emitters forming the overall irrigation system. As will be appreciated, water pressure may vary along the main line and branch lines as a consequence of friction and the like and further each emitter valve structure may not operate in exactly the same fashion whereby one vessel will be filled before another vessel at another position in the irrigation system. However, by maintaining the water pressure for a sufficient length of time, all of the vessels of all the emitters will be satisfactorily filled regardless of pressure variations and rate of filling each vessel.

Water is dispensed from the emitters by means of spaced apart openings 68 which are provided peripherally around the element 36. When it is desired to have water trickle from the vessels 40 for irrigation purposes, the water pressure is reduced by reversing pump 22. The weight of the water in the vessels will then cause the lips 56, 58 to close upon each other, as illustrated in FIG. 3, whereupon water will trickle from the vessels as shown by arrows 70, 72 through the openings 68. After all the water has been evacuated from the lines 12, 14, 16, the vacuum pump 24 may be energized to provide a positive suction against the lips 56, 58 to further insure that these portions will be pulled into the contracted position shown in FIG. 3 to thereby insure the free flow of water from the vessels and to prevent reverse flow of water back into the supply lines.

One aid in the discharge of water from the vessel 40 is the air which is compressed above the water as the vessel is filled (it being noted that there is no vent opening in vessel 40). When the cone portion of the valve element closes, the compressed air tends to expand thus aiding in the discharge of water from the vessel.

The vessel 40 and cup-shaped element 36 may be fabricated of a suitable plastic material such as polyethylene while the valve element 48 may be fabricated of a suitable elastomeric material such as neoprene.

Figure 4:
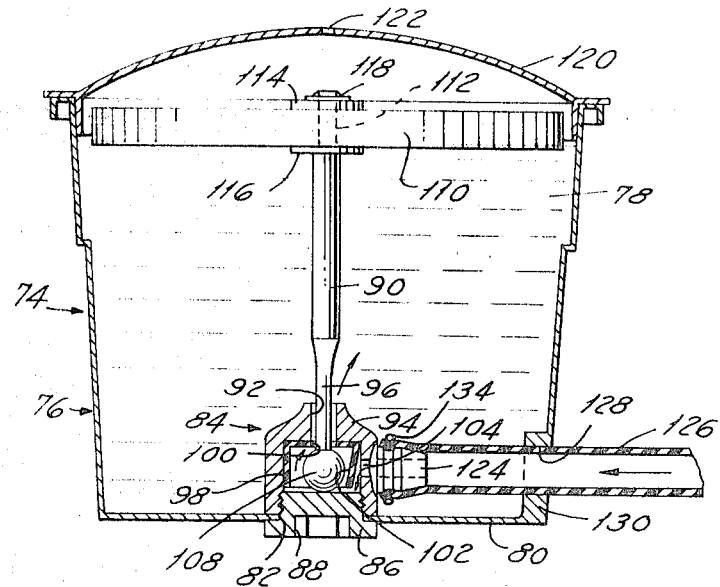
FIG. 4 is an elevational view in section of another emitter embodiment illustrating the emitter in the closed position.
Figure 5:
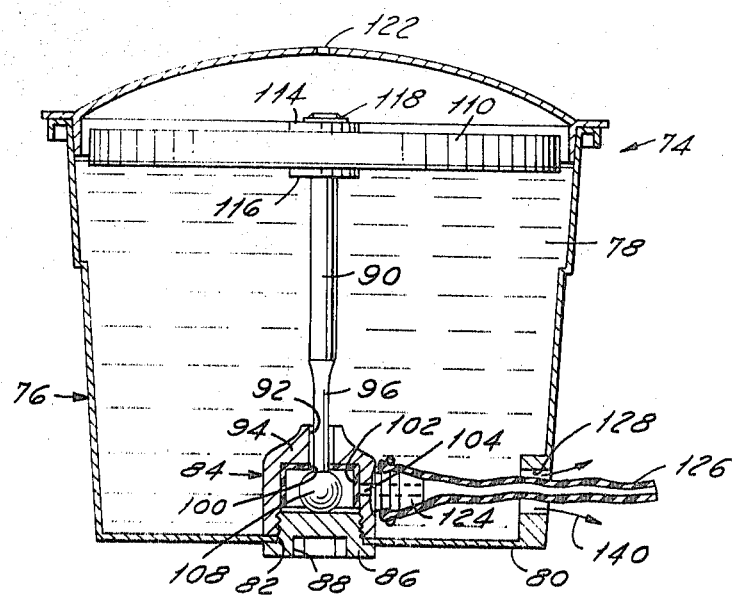
FIG. 5 is a view of the emitter of FIG. 4 with the emitter in the open position for flow of water therefrom.

FIGS. 4 and 5 illustrate another embodiment of an emitter 74. The emitter 74 includes a cup-shaped vessel 76 which acts as a reservoir for water 78. The vessel 76 is suitably placed in the area which is to be irrigated. An opening 82 is provided in the bottom wall 80 for securement of a valve structure which controls filling of the vessel. The valve structure includes an interior cup-shaped element 84 which is positioned with the mouth thereof abutting against the surface of wall 80. The interior surface of the mouth of element 84 is threaded to threadingly receive a nut element 86 which extends through opening 82. The nut element is provided with a socket 88 for engagement of a wrench for tightening thereof. The nut element 86 not only secures element 84 in place but also seals the opening 82.

A rod 90 extends through an opening 92 provided in the upper wall 94 of element 84. The rod 90 has a reduced diameter portion 96 which is of less diameter than opening 92 to permit water to flow through opening 92. The interior of element 84 is lined with an elastomeric cup-shaped element 98. The element 98 has an opening 100 in registry with opening 92 so as not to block this opening. However, one wall portion 102 is adjacent an inlet opening 104 in the side wall 106. During charging of the vessel 76 with water (FIG. 4), the wall 102 flexes radially inwardly to permit passage of water into the cup-shaped element and thence into vessel 76. However, upon cessation of inlet pressure and the application of a partial vacuum to the inlet opening 104, the wall 102 flexes radially outwardly to close opening 104 and prevent water from the vessel discharging through the inlet opening. This is illustrated in FIG. 5.

A ball-shaped valve element 108 is provided on the lower end of rod 90. A disc-shaped float element 110 is provided on the upper end of rod 90. The float element 110 may be fabricated of, for example, styrofoam. The float 110 is received over upper reduced diameter portion 112 of rod 90. It is held in place by means of upper and lower rings 114, 116 and detachable fastener 118. A dome-shaped cover 120 having vent opening 122 is provided on top of the vessel 76 to protect the interior of the vessel against falling fruit or other foreign object. In operation, as the vessel 76 is filled with water, the float 110 will eventually begin rising on the upper surface of the water until the ball 108 engages the opening 100 in the seal 98 whereupon the inlet opening to the vessel 76 is closed thus preventing further charging of the vessel with water and thereby controlling the level of water in the vessel.

Referring to the water inlet means, an inlet nozzle 124 extends from the opening 104. An elastomeric tubular member 126 extends through an opening 128 in enlarged vessel side wall portion 130. The inner end of tubular member 126 is secured to the nozzle 124 by means of a spring wire clamping ring 134 which is received in a groove of the nozzle. The walls of the tubular member 126 are relatively thin and easily flexed so that when water under pressure is supplied therethrough from the source of water under pressure, the wall portions adjacent the opening 128 will flex outwardly and seal off the opening and thereby prevent water from flowing out of the vessel 76, as shown in FIG. 4. When the water supply pressure is diminished and a vacuum applied, the side walls of tubular member 126 will collapse as shown in FIG. 5 thus permitting water to flow in the direction of arrows 140 onto the ground for irrigation purposes.

Figure 6:
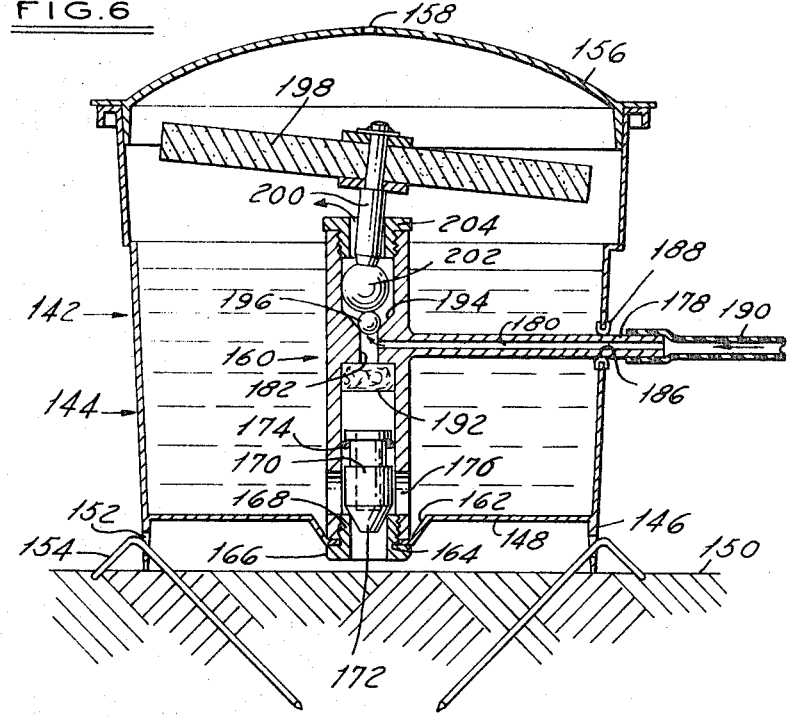
FIG. 6 is an elevational view in section of another embodiment of an emitter in accordance with the present invention, the emitter being illustrated in the closed position.
Figure 7:
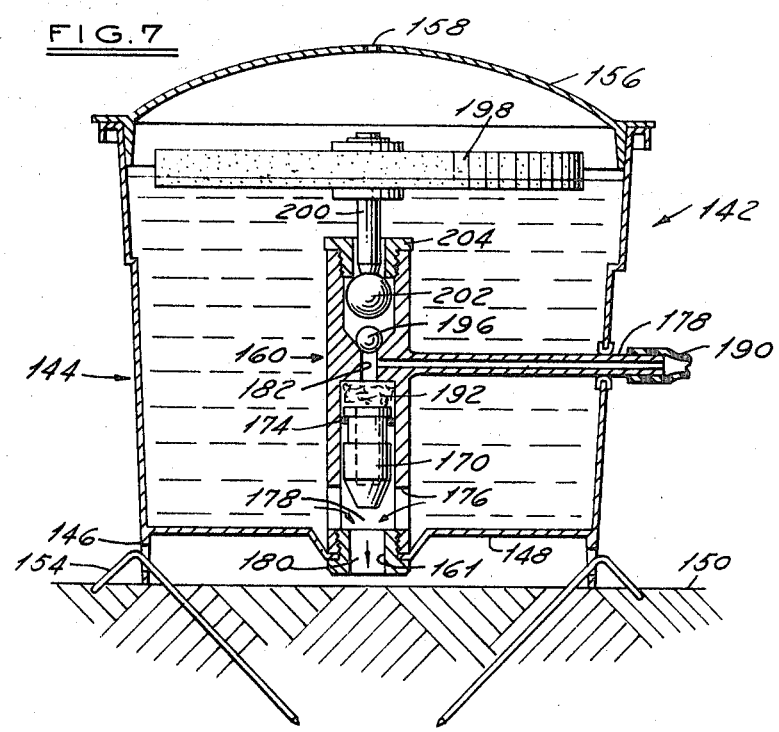
FIG. 7 is a view of the emitter of FIG. 6 illustrating the emitter in the open position for flow of water therefrom.

FIGS. 6 and 7 illustrate another embodiment of an emitter 142 useful in the irrigation system shown in FIG. 1. The emitter 142 comprises an open-topped vessel 144. The vessel 144 has a plurality of spaced apart legs 146 which space the bottom wall 148 from the ground 150 thus permitting direct flow of water from the vessel onto the ground for irrigation purposes. Openings 152 are provided in the legs 146 for passage of anchoring pins 154 therethrough into the ground to secure the emitter in place. A removable cover 156 having a vent 158 is received on the top of the vessel 144. The cover 156 functions to protect the interior of the vessel from foreign objects.

A tubular member 160 is provided interiorly of the vessel 144. The lower end of the tubular member 160 is received in a well 162 formed centrally of the bottom wall 148. An opening 164 is provided in the bottom of the well 162. The externally threaded shank 168 of a nut 166 extends through the opening 164 into the lower end of tubular member 160 which is interiorally threaded for threading engagement with the nut to secure the tubular member 160 in place. The nut has a central opening 161 for the draining of water from vessel 144.

A slidable flotation valve element 170 having a conical lower end 172 is received in the tubular member 160 above the nut 166. An O-ring is provided at the upper end of valve element 170 for sealing engagement between the valve element and the interior surface of tubular member 160. A plurality of spaced apart discharge ports 176 are provided in the lower portion of the tubular member 160. The valve element 170 is positioned against the upper end of the nut 166 as a consequence of water pressure thereabove to thereby prevent passage of water through the nut 166 during the application of positive pressure. Upon relief of the pressure or the application of a vacuum or partial vacuum to the upper end of the valve element, the valve element 170 will float and rise thus opening communication between the ports 176 and the hollow nut 166 permitting flow of water from the vessel to the ground for irrigation purposes.

An inlet duct 178 extends horizontally substantially centrally from the tubular member 160. The duct 178 has a central passageway 180 which communicates with a relatively short passageway 182 of reduced diameter with respect to the main inner diameter of tubular member 160. The duct 178 passes through an opening 186 in the side wall of vessel 144. The opening 186 is made fluid-tight by means of a seal 188. The outer end of the duct 178 is connected to a tubular member 190 which in turn is connected to the source of water under pressure. A block of porous material 192, such as a cellulose sponge, is positioned within tubular member 160 beneath the passageway 182. The function of the sponge 192 is to prevent sticking of valve element 170 in its upper position.

The interior of tubular member 160 immediately above passageway 182 is configured to define a conical recess 194 for reception of a ball 196. During filling of the vessel 144 with water, the ball 196 is forced upwardly thus permitting flow of water upwardly through the tubular member 160. However, upon cessation of water flow and application of a negative pressure, the ball 196 falls and is drawn down into the recess 194 thus preventing flow of water from the vessel back into the water inlet system.

A float structure is provided in the vessel 144 similar to the float structure described in connection with FIGS. 4 and 5. The float structure includes a disc-shaped float member 198 supported on a rod 200 as described in connection with FIGS. 4 and 5. A ball 202 is provided on the lower end of the rod 200. A hollow nut 204 is threadingly received in the upper end of the tubular member 160. The nut 204 has an inner diameter less than the diameter of the ball 202 whereby upon rise of the float 198 to a predetermined height, the ball 202 will seat on the mouth of the nut 204 thereby preventing further charging of water into the vessel 144. Upon a fall of the water level, the float descends thus opening up the tubular member 160 for passage of water into the vessel 144.

In operation of the emitter 142, the vessel 144 is initially charged with water under pressure from the supply system via the duct 178 and upper portion of tubular member 160. When the vessel has been fully charged, the float 198 rises to the predetermined level thus preventing further charging of the vessel. Water under pressure is continued to be applied to the irrigation network until all of the emitters in the system are fully charged with water. Water is then drained from the system via the pump 22. A vacuum may then be created in the system by means of pump 24 whereupon the valve element 170 floats and is drawn upwardly permitting discharge of water through the ports 176 and opening 161 for irrigation purposes as shown by arrows 178, 180. This cycle is repeated as often as is necessary. The system may be automated so as to require a minimum of labor.

It will be appreciated from the irrigation system and components described a number of advantages are inherent.

For example, variation in the pressure of the water supply source does not affect the quantitative accuracy of the water distribution. At any given water pressure, water is charged into the emitters for a time sufficient to fill each emitter regardless of whether the water pressure is high or low.

Further, the system may be easily programmed for a timed cycle of
 a. maximum pressure to zero pressure and repeat, or
 b. maximum pressure to zero pressure to negative pressure and repeat.

The cost of the system may be reduced with respect to prior systems by using smaller pipe diameters and commensurate high pumping pressures to compensate for such smaller pipe sizes. At both the inlet points and discharge points of the emitters, it is not necessary to control the flow of water by means of orifice devices and therefore relatively large inlet and outlet ports are employed which minimize the chance of clogging due to foreign materials in the water used for irrigation.

What I claim as my invention is:

1. An agricultural irrigation system comprising a source of water under pressure, a plurality of emitters located in a pattern for irrigating an area, each emitter comprising a vessel functioning as a water reservoir, means connecting said vessels to a source of water under pressure, outlet means for each vessel for the flow of water therefrom, and pressure operated valve means in said outlet means responsive to a reduction in inlet pressure to open and permit flow of water from the vessels.

2. An agricultural irrigation system as defined in claim 1, further characterized in the provision of means for retracting water from said means connecting said vessels to the source of water under pressure to thereby reduce the inlet pressure and cause said pressure operated valve means to open.

3. An agricultural irrigation system as defined in claim 1, further characterized in the provision of means for applying a negative pressure to said pressure operated valve means to cause said valve means to open.

4. An agricultural irrigation system as defined in claim 1, further characterized in that said pressure operated valve means includes a valve element movable to one position to close the outlet means from each vessel and open the inlet means to each vessel upon the application of a predetermined inlet water pressure and to move to another position upon reduction in the inlet pressure to open the outlet means and close the inlet means of each vessel.

5. An agricultural irrigation system as defined in claim 4, further characterized in that said valve element comprises an elastomeric sleeve-like element having one open end connected to the inlet means, the other end of said element being free from restraint and extending into an opening provided in the vessel, secondary openings provided downstream from said opening in the vessel, the free end of the valve element flexing radially outwardly upon the application of inlet pressure to close said opening in the vessel and prevent water from escaping therefrom while permitting water to be charged thereinto, said free end collapsing upon reduction of inlet pressure to thereby permit flow of water through the opening into the vessel and thence through said secondary openings for irrigation purposes.

6. An agricultural irrigation system as defined in claim 5, further characterized in that the free end of said valve element is generally cone-shaped, the cone being slit at the apex thereof to define a pair of lips capable of flexing radially outwardly and radially inwardly in accordance with applied pressure.

7. An agricultural irrigation system as defined in claim 5, further characterized in the provision of means for applying a negative pressure to the valve element to cause collapse thereof and closing thereof to prevent water flow back thereinto.

8. An agricultural irrigation system as defined in claim 5, further characterized in that said valve element is positioned in the lower portion of the vessel whereby water within the vessel exerts a pressure thereagainst tending to collapse the valve element upon a reduction of inlet water pressure.

9. An agricultural irrigation system as defined in claim 1, further characterized in that the vessel does not have a vent opening for escape of air as the vessel is filled whereby air is entrapped in the upper portions of the vessel during filling with water, said trapped air being in compression after the vessel is filled and aiding in causing water to flow from the vessel upon opening of the outlet means.

10. An agricultural irrigation system as defined in claim 1, further characterized in that said pressure operated valve means includes a flexible tubular element, said vessel having an opening thereinto through which the tubular element extends, said tubular element flexing radially outwardly upon the application of inlet water pressure to the interior thereof to close said opening and prevent water from flowing from the vessel during the time that inlet pressure is applied, said tubular element collapsing upon a reduction of inlet pressure to thereby permit flow of water from the vessel through said opening for irrigation purposes.

11. An agricultural irrigation system as defined in claim 10, further characterized in the provision of second valve means in the vessel connected to said flexible tube, said second valve means including a check valve element movable to one position upon application of input water under pressure to permit filling of the vessel and movable to a second position upon a reduction of inlet water pressure to close said second valve means and prevent outflow of water from the vessel back into the inlet means.

12. An agricultural irrigation system as defined in claim 11, further characterized in that said second valve means includes a valve body having an interior chamber with an inlet opening thereto connected to the flexible tube and an outlet opening for passage of water into the vessel, a flexible sheet structure lining the interior of said chamber and including at least one flexible movable wall element positioned adjacent the inlet opening to said chamber, inlet water pressure causing said wall element to flex radially inwardly to thus permit passage of water into the chamber and thence into the vessel, said wall portion flexing to close the inlet opening to the chamber upon a reduction of inlet pressure thereby preventing outflow of water from the vessel back into the inlet means.

13. An agricultural irrigation system as defined in claim 1, further characterised in the provision of a float within said vessel, a valve body having an interior chamber connected to the inlet means, said valve body having an outlet therefrom communicating with the interior of the vessel, a valve element within said chamber, means connecting said valve element to the float whereby when the float rises to a predetermined level, the valve element will close the outlet from the valve body and prevent further charging of water into the vessel.

14. An agricultural irrigation system as defined in claim 1, further characterized in that said inlet and outlet means are integrated together and comprise an inlet conduit extending into the vessel, a valve body located interiorly of the vessel and connected in fluid communication with the inlet conduit, said valve body having an upper chamber and a lower chamber interconnected by a passageway of reduced diameter with respect to the diameters of the chambers, said inlet conduit being connected to said passageway, a movable check valve element provided in each of the upper chamber and the lower chamber, opening means for discharge of water from the vessel in the lower portion of said valve body, opening means in the upper portion of the chamber for flow of water from the valve body into the vessel for filling of the vessel, the lower valve element being moved to a position to close the discharge opening means upon the application of inlet water pressure, the upper valve being moved out of restricting position upon the application of inlet water pressure, vacuum means connected to the inlet conduit and being operative upon filling of the vessel to apply a negative pressure to the interior of the valve body to move the lower valve element upwardly and open the outlet for discharge of water from the vessel and move the upper valve element downwardly into a position blocking said passageway to prevent flow of water from the vessel back into the inlet conduit.

15. A method for agricultural irrigation comprising providing a plurality of vessels for holding irrigation water in a pattern for irrigating an area of land, simultaneously filling said vessels with water from a central source of water under pressure, maintaining water pressure to the vessels for a time sufficient to fill all of the vessels irrespective of the number of vessels of the difference of water pressure at any given vessel, providing a pressure operated valve means in each vessel for opening an outlet from the vessel upon a reduction in inlet water pressure, and simultaneously reducing the inlet pressure to all of the vessels to open the valve means in each vessel for the flow of water from the vessels onto the ground for irrigation purposes.

16. The method as defined in claim 15, further characterized in the simultaneous application of a negative pressure to the valve means of each vessel for actuation of the valve means to open the valve means when desired.

\* \* \* \* \*

UNITED STATES PATENT OFFICE
CERTIFICATE OF CORRECTION

Patent No. 3,788,544　　　　Dated January 29, 1974

Inventor(s) Onni S. Koskinen

It is certified that error appears in the above-identified patent and that said Letters Patent are hereby corrected as shown below:

The correct spelling of the inventor's name is:

ONNI S. KOSKINEN

Signed and sealed this 10th day of September 1974.

(SEAL)
Attest:

McCOY M. GIBSON, JR.　　　　C. MARSHALL DANN
Attesting Officer　　　　　　Commissioner of Patents